United States Patent
Digenis et al.

(10) Patent No.: US 9,738,739 B2
(45) Date of Patent: Aug. 22, 2017

(54) METHOD OF FIXING RADIOACTIVE TRITIATED WATER IN A STABLE TRITIATED POLYSTYRENE PRODUCT

(71) Applicants: George A. Digenis, Louisville, KY (US); Alexander G. Digenis, Louisville, KY (US)

(72) Inventors: George A. Digenis, Louisville, KY (US); Alexander G. Digenis, Louisville, KY (US)

(*) Notice: Subject to any disclaimer, the term of this patent is extended or adjusted under 35 U.S.C. 154(b) by 0 days.

(21) Appl. No.: 14/756,286

(22) Filed: Aug. 20, 2015

(65) Prior Publication Data

US 2016/0159951 A1 Jun. 9, 2016

Related U.S. Application Data

(60) Provisional application No. 62/039,495, filed on Aug. 20, 2014.

(51) Int. Cl.
*C08F 212/08* (2006.01)
*C08F 212/36* (2006.01)
*G21F 9/16* (2006.01)

(52) U.S. Cl.
CPC .................. *C08F 212/08* (2013.01)

(58) Field of Classification Search
CPC ...... G21F 9/167; C08F 212/08; C08F 212/36; C08F 279/02; C08F 279/04
USPC .................. 588/8, 315; 526/75, 336
See application file for complete search history.

(56) References Cited

U.S. PATENT DOCUMENTS

| | | | |
|---|---|---|---|
| 4,020,003 A | 4/1977 | Steinberg et al. |
| 4,085,061 A | 4/1978 | O'Brien |
| 4,173,620 A | 11/1979 | Shimizu |
| 4,190,515 A | 2/1980 | Butler et al. |
| 5,854,080 A | 12/1998 | Harvey |
| 6,110,373 A | 8/2000 | Patterson et al. |
| 6,416,671 B1 | 7/2002 | Pourfarzaneh |
| 6,632,367 B1 | 10/2003 | Furlong et al. |
| 6,984,327 B1 | 1/2006 | Patterson |
| 7,470,350 B2 | 12/2008 | Bonnett et al. |
| 8,889,582 B2 | 11/2014 | Noguchi et al. |
| 9,040,768 B2 | 5/2015 | Lefebvre et al. |
| 2012/0106692 A1 | 5/2012 | Keenan |
| 2013/0336870 A1 | 12/2013 | Denton et al. |

FOREIGN PATENT DOCUMENTS

| | | | | |
|---|---|---|---|---|
| EP | 0556005 A1 | * | 8/1993 | ............. C09K 11/06 |
| GB | 1002426 | * | 8/1965 | ............. C09K 11/06 |

* cited by examiner

*Primary Examiner* — Fred M Teskin
(74) *Attorney, Agent, or Firm* — Carrithers Law Office, PLLC

(57) ABSTRACT

The present invention relates to a method and covalent bonding process for fixing tritiated water into a polystyrene based product for the permanent elimination of tritiated water from the environment.

18 Claims, 2 Drawing Sheets

METHOD OF FIXING RADIOACTIVE TRITIATED WATER IN A STABLE TRITIATED POLYSTYRENE PRODUCT

CROSS REFERENCE TO RELATED APPLICATIONS

This application claims priority from Provisional Application Ser. No. 62/039,495 filed on Aug. 20, 2014 which is incorporated by reference herein in its entirety.

FIELD OF INVENTION

The present invention describes methodology for the permanent elimination of tritiated water from the environment by fixing radioactive tritiated water into an organic insoluble substances into a polystyrene or its derivatives.

BACKGROUND OF INVENTION

Tritium (T) is a hydrogen atom that has two neutrons in the nucleus and a single proton, giving it an atomic weight near three. Tritium has a half-life of 12.3 years and emits a very weak beta particle. Tritium replaces one of the stable hydrogens in the water molecule to form tritiated water. Apart of its natural formations in the upper atmosphere when cosmic rays strike nitrogen molecules in the air, tritium is produced during nuclear weapons explosions as a byproduct as well as in commercial reactors producing electricity and in special production reactors like in the government weapons production plants. Although tritium can be a gas, its most common form is in water which is formed when it reacts with oxygen to form tritiated (radioactive) water.

Tritiated water is concentrated in respect to tritium by isotopic separation. This allows the dispersion of a large quantity of very low activity water to the environment and the required fixation of a small quantity of relatively high activity tritiated water. It also allows the recovery of deuterium for tritiated heavy water wastes from certain types of fission reactors.

Tritium is considered one of the most innocuous of fission products. Tritiated water and its vapor can be taken into the body by skin penetration. The retention of tritium in the body is dependent on the chemical form in which it enters. The probability of genetic and somatic damage from tritium exposure is enhanced when tritium is ingested, The most common documented sources of tritium in the environment are (a) from improper disposal of this isotope in municipal landfills, and (b) from leakages occurring from commercial reactors. If improperly stored, it seeps through landfills and passes into waterways, carrying the radioactive tritium with it.

As with all ionizing radiation, exposure of humans to tritium increases the risk of developing cancer. This is the reason why the Environmental Protection Agency (EPA) has established standards for the maximum amount of tritium that may be released by nuclear facilities or quantity that may be found in drinking water.

The present methods of eliminating tritiated water (water contaminated with radioactive tritium) involve compounds with liquids and solids or absorption of the contaminated water with organic molecules through non-covalent binding during storage. This method of elimination, by a "reversible" chemical entrapment represents a temporary solution to the problem of protecting the environment. Being reversibly bound, tritiated water would ultimately seep out of its usual underground storage and ultimately contaminate waterways.

DESCRIPTION OF THE PRIOR ART

Patents relating to the present invention are as follows: US 20120106692 for SYSTEMS AND METHOD FOR REDUCING TRITIUM MIGRATION by Keenan, US 20130336870 for Advanced Tritium System for Separation of Tritium from Radioactive Wastes and Reactor Water in Light Water Systems by Denton, U.S. Pat. No. 4,020,003 Fixation of Tritium in a Highly Stable Polymer Form by Steinberg, U.S. Pat. No. 4,085,061 for Tritiated Water Treatment Process by O'Brien, U.S. Pat. No. 4,173,620 Extraction Method of Titium by Shimizu, U.S. Pat. No. 4,190,515 Apparatus for Removal and Recovery of Tritium from Light and Heavy Water by Butler, U.S. Pat. No. 5,854,080 for a Process for Separating Tritiated Water by Harvey, U.S. Pat. No. 6,110,373 for Method for Separating Heavy Isotopes of Hydrogen from Water by Patterson, U.S. Pat. No. 6,416,671 Methods for Removing Hazardous Organic Molecules from Liquid Waste by Pourfarzaneh, U.S. Pat. No. 6,632,367 for Method for Separating Heavy Isotopes of Hydrogen from Water by Furlong, U.S. Pat. No. 6,984,327 for System and Method for Separating Heavy Isotopes of Hydrogen Oxide from Water by Patterson, U.S. Pat. No. 7,470,350 for a Process for tritium removal from light water by Bonnett, U.S. Pat. No. 8,889,582 Hydrogen Combustion Catalyst and Method for Producing Thereof, and Method for Combusting Hydrogen by Noguchi, and U.S. Pat. No. 9,040,768 for a Method for Limiting the Degassing of Tritiated Waste Issued from the Nuclear Industry by Lefebvre.

The conventional methods utilize a process of complexing or absorbing the tritiated water with organic molecules through non-covalent bonding. This type of non-covalent association represents a temporary and reversible type of association that does not constitute a permanent removal of radioactivity due to the tritium (long lived radio nuclide with a half-life of 12.3 years). With passage of time, the radioactivity from non-covalently bonded tritium atom infiltrated water will ultimately be released into the environment.

SUMMARY OF THE INVENTION

The present invention describes methodology for the permanent elimination of tritiated water from the environment. The salient principle of the method is the incorporation of the tritium, existing in the radioactive tritiated water, into organic insoluble substances through a covalent bond. The incorporation of the tritium occurs into such inert substances as polystyrene or its derivatives.

Calcium carbide (CaC2) is reacted with tritiated water to produce tritiated acetylene. This is an exothermic reaction represented by the following equation:

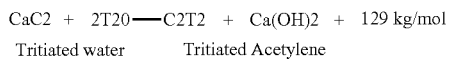

CaC2 + 2T2O ⟶ C2T2 + Ca(OH)2 + 129 kg/mol
Tritiated water    Tritiated Acetylene When tritiated acetylene is passed through a red hot copper tube, it polymerizes to form tritiated benzene (cyclotrimerization step). The tritiated benzene is converted to tritiated ethyl benzene by its reaction with ethyl chloride in an acid-catalyzed chemical reaction represented by the following mechanism. The hydrochloric acid produced is channeled into a solution of concentrated sodium hydroxide (NaOH). The latter produces sodium chloride (NaCl) and tritiated water. The latter is collected and is recycled to react with calcium carbide to produce tritiated acetylene. The tritiated acetylene is subject to a heat and a copper catalyst to form a tritiated ethyl benzene by-product. The tritiated ethyl benzene is converted in the presence of steam over iron oxide-based catalyst to tritiated styrene as represented by the catalytic dehydrogenation. The polymerization or copolymerization of the tritiated styrene with variable amounts of divinyl benzene (0.2-1%), as a cross-linking agent, produces the tritiated polystyrene. The latter can be micronized into particles with a desired radius (size) or can be converted in a form of solid sheaths of plastic. The tritium atom by being covalently bonded into the benzene moieties of the water-insoluble and unreactive polystyrene molecule is securely eliminated from the environments, i.e. it is not allowed to leach out from its storage.

The present invention provides for the permanent storage of tritiated water in solid form which is virtually free of leaching when in contact with water.

More particularly, the present invention comprises, consists of and/or consists essentially of a method of producing an insoluble tritiated polystyrene, comprising the steps of reacting tritiated water with calcium carbide to produce a tritiated acetylene by-product; reacting said tritiated acetylene by-product with heat and a first catalyst to form a tritiated ethyl benzene by-product; reacting said tritiated ethyl benzene in the presence of steam and an iron oxide based second catalyst via catalytic dehydrogenation form a tritiated styrene by-product; and polymerizing said tritiated styrene by-product with an effective amount of divinyl benzene cross-linking agent producing an insoluble tritiated polystyrene compound.

Polystyrene is a thermopolymer which melts at temperatures 100° C., and becomes rigid again when cooled. This temperature behavior is exploited for extrusion, molding, and vacuum forming, since it can be cast into molds with fine detail. Polystyrene is very slow to biodegrade. Polystyrene is a long chain hydrocarbon wherein alternating carbon centers are attached to phenyl groups (the name given to the aromatic ring benzene). Polystyrene's chemical formula is © 8H8)n; The material's properties are determined by short-range van der Waals attractions between polymers chains. Since the molecules are long hydrocarbon chains that consist of thousands of atoms, the total attractive force between the molecules is large. Polystyrene results when styrene monomers interconnect. In the polymerization, the carbon-carbon pi bond (in the vinyl group) is broken and a new carbon-carbon single (sigma) bond is formed, attaching another styrene monomer to the chain. The newly formed sigma bond is much stronger than the pi bond that was broken, thus it is very difficult to de-polymerize polystyrene. About a few thousand monomers typically comprise a chain of polystyrene, giving a molecular weight of 100,000-400,000. Pure polystyrene is brittle, but hard enough that a fairly high-performance product can be made by giving it some of the properties of a stretchier material, such as polybutadiene rubber. The materials can never normally be mixed because of the amplified effect of intermolecular forces on polymer insolubility, but if polybutadiene is added during polymerization it can become chemically bonded to the polystyrene, forming a graft copolymer, which helps to incorporate normal polybutadiene into the final mix, resulting in high-impact polystyrene. Several other copolymers are also used with styrene such as acrylonitrile butadiene styrene, a copolymer of acrylonitrile and styrene, toughened with polybutadiene. SAN is a copolymer of styrene with acrylonitrile, and SMA with maleic anhydride. Styrene can be copolymerized with other monomers; for example, divinylbenzene can be used for cross-linking the polystyrene chains.

In accordance with a preferred embodiment of this invention, tritiated water is reacted with calcium carbide to produce calcium hydroxide and acetylene, separating the final products, and polymerizing the acetylene to form a stable tritiated polystyrene compound. To improve the yield of the process, the calcium hydroxide may be calcinated to remove the tritiated water and the water-calcium carbide reaction is repeated.

It is an object of the present invention to provide for the fixation of tritiated water in such form as to minimize leachability.

It is an object of the present invention to provide a method for covalently bonding tritiated water with a polymer producing a tritiated polystyrene.

It is object of the present invention to react tritiated water with calcium carbide to produce a tritiated acetylene by-product.

It is an object of the present invention to process the tritiated acetylene by-product with heat and a catalyst to form a tritiated ethyl benzene by-product.

It is an object of the present invention to convert the tritiated ethyl benzene in the presence of steam and over iron oxide based catalyst to tritiated styrene by-product via catalytic dehydrogenation.

It is an object of the present invention to copolymerize the tritiated styrene by-product with an effective amount of divinyl benzene cross-linking agent to produce a fixed tritiated polystyrene and derivatives thereof.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENT

Tritium fixation by incorporation into a polymeric form results in both low leachability and tritium exchange rates due to the nature of the strong hydrogen-carbon covalent bond. The initial reaction is based on the polymerization of acetylene produced by the reaction of tritiated water with calcium carbide.

Step 1:

Calcium carbide (CaC2) is reacted with tritiated water to produce tritiated acetylene. This is an exothermic reaction.

The concentrated tritium waste is converted to Tritiated acetylene by reaction with calcium carbide, in accordance with the following reaction:

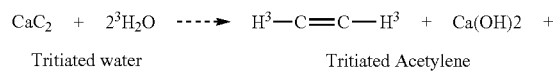

$CaC_2$ + $2^3H_2O$ ----> $H^3-C \equiv C-H^3$ + $Ca(OH)2$ +

Tritiated water        Tritiated Acetylene 129 kg/mol

The reaction of tritiated water with calcium carbide partitions only a portion of the initial tritium as tritiated acetylene, the remainder is contained in tritiated calcium hydroxide.

The tritiated water can be removed from the calcium hydroxide by calcination at 350 to 400° C. and recycled to the tritiated water calcium carbide reaction. Alternately, the calcium hydroxide can be reacted with hydrochloric acid to yield calcium chloride and tritiated water.

Step 2

Figure 1:
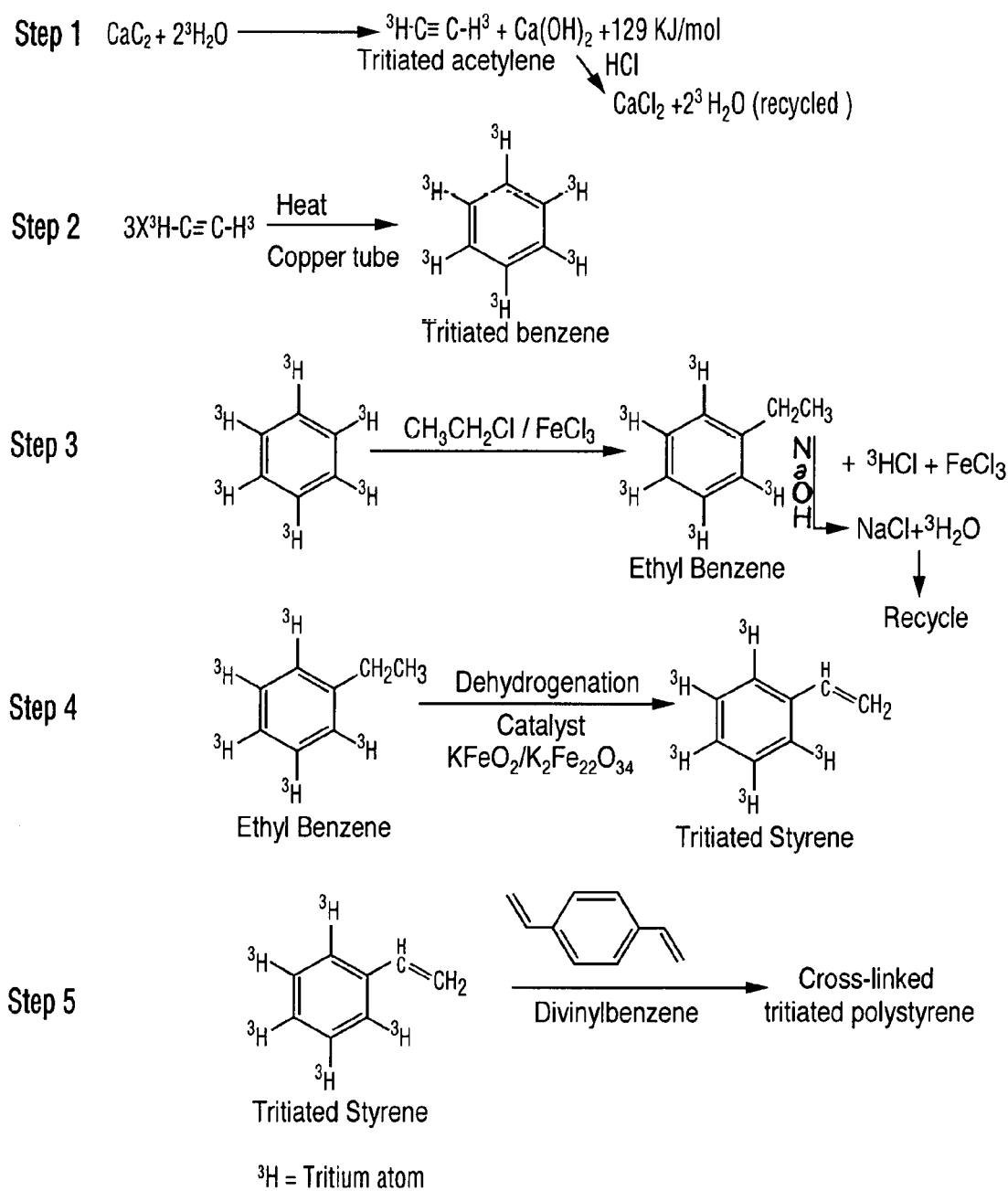
FIG. 1 is a schematic depicting the chemical bonding of the radioactivity from tritiated after into an insoluble polystyrene matrix via covalent bonding.
Figure 2:
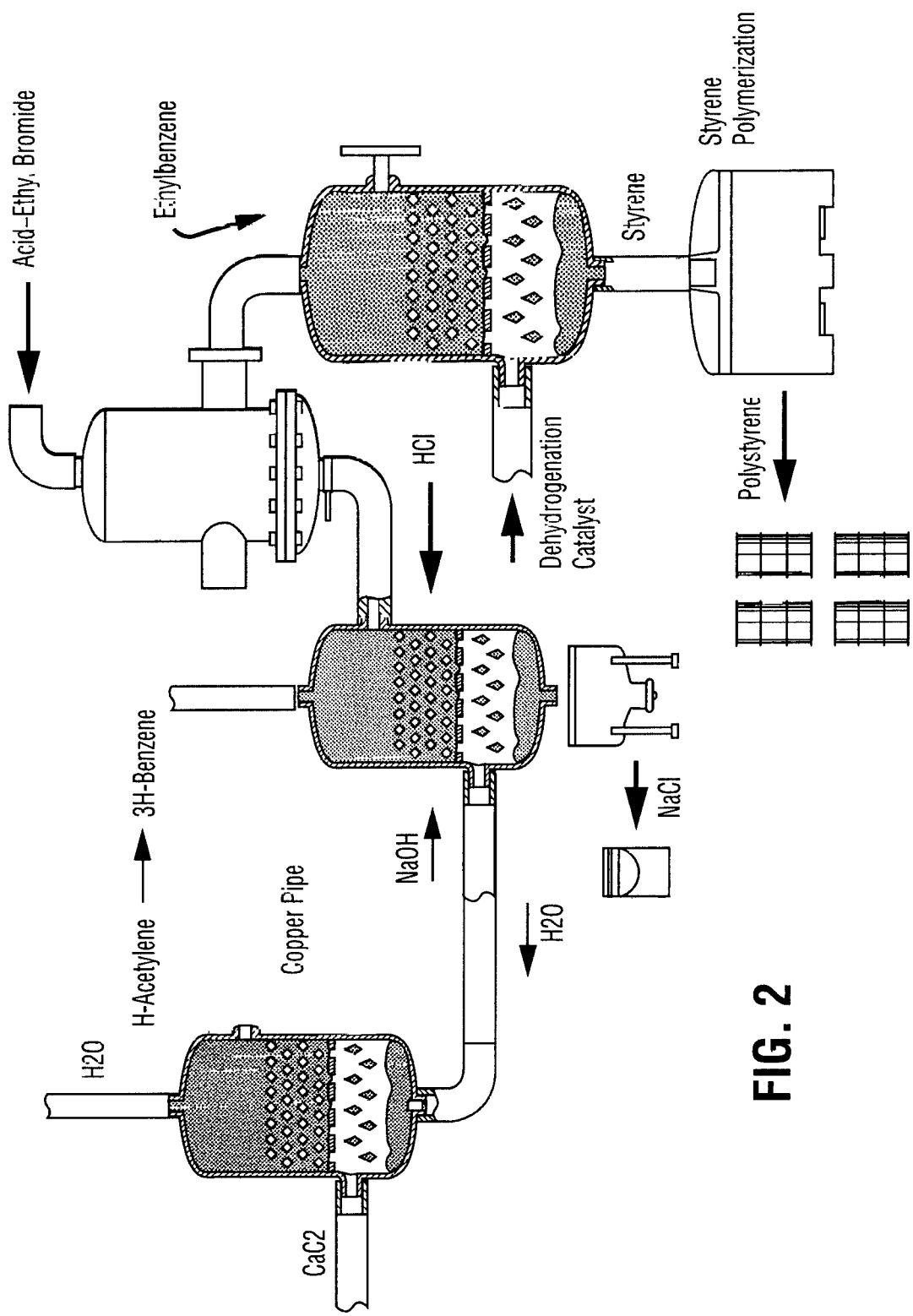
FIG. 2 is a flow diagram of the process for conversion of tritiated water to an insoluble polystyrene.

Tritiated acetylene is passed through a catalyst such as a red hot copper tube where it polymerizes to form a tritiated benzene (the cyclotrimerization step) as shown in FIG. 1.

Step 3

The tritiated benzene is converted to tritiated ethyl benzene by its reaction with ethyl chloride in an acid-catalyzed (ferric chloride) chemical reaction. The hydrochloric acid produced is channeled into a solution of concentrated sodium hydroxide (NaOH). The latter produces ferric chloride ,sodium chloride (NaCl) and tritiated water. The latter is collected and is recycled to react with calcium carbide to produce tritiated acetylene as shown in Step 1 of FIG. 1.

Step 4

The tritiated ethyl benzene is converted in the presence of steam over iron oxide-based catalyst ($KFeO_2/K_2Fe_{22}O_{34}$) to a tritiated styrene as represented by the catalytic dehydrogenation reaction shown in Step 4 of FIG. 1.

Step 5

The copolymerization of the tritiated styrene with variable amounts of divinyl benzene as a cross-linking agent, produces the insoluble tritiated polystyrene as shown in FIG. 1. In a preferred embodiment, the amount to divinyl benzene is from 0.01 to 5.0% by weight, more preferably from 0.1 to 2% by weight, and more preferably from 0.2 to 1% by weight.

It is contemplated that additional materials such as polybutadiene can be added during polymerization to become chemically bonded to the polystyrene, forming a graft copolymer, which helps to incorporate normal polybutadiene into the final mix, resulting in high-impact polystyrene. Several other copolymers are also used with styrene such as acrylonitrile butadiene styrene, a copolymer of acrylonitrile and styrene, toughened with polybutadiene. SAN is a copolymer of styrene with acrylonitrile, and SMA with maleic anhydride. Styrene can also be copolymerized with other monomers; for example, divinylbenzene can be used for cross-linking the polystyrene chains.

Divinylbenzene consists of a benzene ring bonded to two vinyl groups. It is related to styrene (vinylbenzene) by the addition of a second vinyl group. Divinylbenzene is usually a 2:1 mixture of m and p-divinylbenzene, containing the corresponding ethylvinyl benzene isomers. When reacted with styrene, divinylbenzene can be used as a reactive monomer in polyester resins. Styrene and divinylbenzene react together to form the copolymer styrene-divinylbenzene, S-DVB or Styrene-DVB resulting in cross-linked polymer.

The tritiated polystyrene can be micronized into particles with a desired radius (size) or can be converted in a form of solid sheaths of plastic. The tritium atom by being covalently bonded into the benzene moieties of the water-insoluble and unreactive polystyrene molecule is securely eliminated from the environments, i.e. it is not allowed to leach out from its storage.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A method of removing tritium from tritiated water and binding said tritium into an insoluble tritiated polystyrene, comprising the steps of:
   reacting tritiated water with calcium carbide to produce a tritiated acetylene by-product;
   polymerizing said tritiated acetylene by-product with heat and a first catalyst to form a tritiated benzene by-product;
   reacting said tritiated benzene by-product with ethyl chloride and ferric chloride in the presence of an acid forming a tritiated ethyl benzene by-product;
   reacting said tritiated ethyl benzene by-product in the presence of steam and an iron oxide based second catalyst via catalytic dehydrogenation forming a tritiated styrene by-product;
   copolymerizing said tritiated styrene by-product with an effective amount of divinyl benzene cross-linking agent producing an insoluble tritiated polystyrene compound.

2. A tritiated polystyrene compound containing covalently bonded tritium produced in accordance with the method of claim 1.

3. A method of producing an insoluble tritiated polystyrene, consisting essentially of the steps of:
   reacting tritiated water with calcium carbide to produce a tritiated acetylene by-product;
   polymerizing said tritiated acetylene by-product with heat and a first catalyst to form a tritiated benzene by-product;
   reacting said tritiated benzene by-product with ethyl chloride and ferric chloride in the presence of an acid forming a tritiated ethyl benzene by-product;
   reacting said tritiated ethyl benzene by-product in the presence of steam and an iron oxide based second catalyst via catalytic dehydrogenation forming a tritiated styrene by-product;
   copolymerizing said tritiated styrene by-product with an effective amount of divinyl benzene cross-linking agent producing an insoluble tritiated polystyrene compound.

4. The method of claim 1,
   wherein said step of reacting said tritiated water with said calcium carbide also produces a tritiated calcium hydroxide and further comprising the step of calcinating said tritiated calcium hydroxide to remove tritiated water therefrom.

5. The method of claim 1, further comprising the step of copolymerizing said tritiated styrene by-product with a polybutadiene and an effective amount of divinylbenzene cross linking agent producing an insoluble tritiated polystyrene/polybutadiene graft copolymer compound containing covalently bonded tritium.

6. An insoluble tritiated polystyrene/polybutadiene graft copolymer compound containing covalently bonded tritium produced in accordance with the method of claim 5.

7. An insoluble tritiated polystyrene graft copolymer compound containing covalently bonded tritium and a monomer or a copolymer selected from the group consisting of a polybutadiene, an acrylonitrile butadiene styrene, an acrylonitrile, a maleic anhydride, and combinations thereof added during polymerization with an effective amount of a divinylbenzene cross linking agent produced in accordance with the method of claim 1.

8. The method of claim 1, wherein said step of reacting said tritiated water with said calcium carbide also produces a tritiated calcium hydroxide and further comprising the step of reacting said tritiated calcium hydroxide with a hydrochloric acid to yield a calcium chloride and tritiated water.

9. The method of claim 3, further comprising the step of copolymerizing said tritiated styrene by-product with a polybutadiene and an effective amount of divinylbenzene cross linking agent producing an insoluble tritiated polystyrene/polybutadiene graft copolymer compound containing covalently bonded tritium.

10. An insoluble tritiated polystyrene/polybutadiene graft copolymer compound containing covalently bonded tritium produced in accordance with the method of claim 9.

11. A method of incorporating tritium arising from tritiated water into a polystyrene consisting essentially of the steps of:
    reacting tritiated water with calcium carbide to produce a tritiated acetylene by-product;
    polymerizing said tritiated acetylene by-product producing a tritiated benzene;
    reacting said tritiated benzene with ethyl chloride and ferric chloride to form a tritiated ethyl benzene;
    converting said tritiated styrene to a tritiated styrene by catalytic dehydrogenation in the presence of steam and an iron oxide catalyst; and
    copolymerizing said tritiated styrene with an effective amount of a divinylbenzene cross linking agent producing an insoluble tritiated polystyrene compound containing covalently bonded tritium.

12. The method of claim 11, further comprising the step of copolymerizing said tritiated styrene with a polybutadiene and an effective amount of divinylbenzene cross linking agent producing an insoluble tritiated polystyrene/polybutadiene graft copolymer compound containing covalently bonded tritium.

13. A method of incorporating tritium arising from tritiated water into a polystyrene comprising the steps of:
    reacting tritiated water with calcium carbide to produce a tritiated acetylene by-product;
    polymerizing said tritiated acetylene by-product producing a tritiated benzene;
    reacting said tritiated benzene with ethyl chloride and ferric chloride to form a tritiated ethyl benzene;
    converting said tritiated styrene to a tritiated styrene by catalytic dehydrogenation in the presence of steam and an iron oxide catalyst; and
    copolymerizing said tritiated styrene with an effective amount of a divinylbenzene cross linking agent producing an insoluble tritiated polystyrene compound containing covalently bonded tritium.

14. A tritiated polystyrene compound containing covalently bonded tritium produced in accordance with the method of claim 13.

15. The method of claim 13,
    wherein said step of reacting said tritiated water with said calcium carbide also produces a tritiated calcium hydroxide and further comprising the step of calcinating said tritiated calcium hydroxide to remove tritiated water therefrom.

16. The method of claim 13, wherein said step of reacting said tritiated water with said calcium carbide also produces a tritiated calcium hydroxide and further comprising the step of reacting said tritiated calcium hydroxide with a hydrochloric acid to yield a calcium chloride and tritiated water.

17. The method of claim 13, further comprising the step of copolymerizing said tritiated styrene with a polybutadiene and an effective amount of divinylbenzene cross linking agent producing an insoluble tritiated polystyrene/polybutadiene graft copolymer compound containing covalently bonded tritium.

18. An insoluble tritiated polystyrene/polybutadiene graft copolymer compound containing covalently bonded tritium produced in accordance with the method of claim 17.

* * * * *